Patented May 5, 1925.

1,536,305

UNITED STATES PATENT OFFICE.

FERDINAND W. NITARDY, OF BROOKLYN, NEW YORK, ASSIGNOR TO E. R. SQUIBB & SONS, OF NEW YORK, N. Y., A CORPORATION OF NEW YORK.

DENTIFRICE MATERIAL.

No Drawing. Application filed November 13, 1923. Serial No. 674,484.

*To all whom it may concern:*

Be it known that I, FERDINAND W. NITARDY, a citizen of the United States, residing at Brooklyn, in the county of Kings, State of New York, have invented certain new and useful Improvements in Dentifrice Material; and I do hereby declare the following to be a full, clear, and exact description of the invention, such as will enable others skilled in the art to which it appertains to make and use the same.

This invention relates to a dentifrice material, and particularly to a product which is adapted to be incorporated in pastes and to impart thereto certain desired properties.

Pastes are commonly employed as dentifrices and have been manufactured in the past from various materials, particularly precipitated chalk. This material alone is not adapted to neutralize the acids which form in the mouth and is not, therefore, a satisfactory dentifrice. Magnesium hydroxide is a mild alkali and a suitable dentifrice material but it is chemically reactive to a considerable degree, and in the presence of water chemical reactions occur between the ingredients of the paste which cause it to harden and thus become useless.

Magnesium hydroxide is ordinarily prepared in the presence of water by mixing magnesium oxide with water or otherwise. It is an extremely light material, and in the presence of water is somewhat gelatinous. When the water is separated by draining a mass is obtained which is reasonably solid but which, nevertheless, contains ordinarily not more than 14% of magnesium hydroxide with 86% of water. This material may be mixed with other ingredients to form a tooth paste, but it has been found to be unsatisfactory for the reasons above indicated.

It is the object of the present invention to provide magnesium hydroxide in a form in which it is free from the tendency to harden when combined with other ingredients of tooth pastes.

I have discovered that the chemical activity of magnesium hydroxide is retarded in the presence of glycerine to the extent that a mixture of magnesium hydroxide and glycerine which is substantially free from water may be used as the basis of tooth pastes and that when so used it imparts to the paste desirable properties, for example, its tendency to neutralize acids. As a further advantage magnesium hydroxide is soft and non-injurious and is, therefore, a suitable material for use as an ingredient of dentifrices.

In preparing the material milk of magnesia, i. e., a suspension of magnesium hydroxide in water, is first produced in any suitable manner, various methods being known in the art. The water is then drained from the suspension so far as this is possible, leaving a mass of magnesium hydroxide suspended in approximately 86% of water by weight based upon the total weight of the mass. The proportions of magnesium hydroxide and water will, of course, vary depending upon the time during which the mass is permitted to drain and these proportions are not essential to the invention.

After draining the mass is placed in a suitable evaporating pan which may be operated under vacuum or otherwise, depending upon the available equipment. The pan should be of glass, Monel metal or other suitable material which is not susceptible to corrosion in the presence of weak alkalies. Glycerine of the usual commercial purity is added to the mass in proportion to provide an amount equivalent to the amount of water therein, and the mass is subjected to evaporation until the water has been removed substantially. It is not necessary that all of the water be separated since it is the function of the glycerine to retard the chemical activity of the magnesium hydroxide and this will be accomplished with a predominating proportion of glycerine in the mass. At the conclusion of the evaporation the mass will consist of a thick paste of approximately the consistency of lard containing about fourteen per cent of magnesium hydroxide suspended in glycerine. The proportions will vary depending upon the amount of glycerine which is added and are of relatively slight importance.

This paste, consisting of magnesium hydroxide and glycerine substantially free from water, is adapted to be combined with various other ingredients in proper proportions to produce a dentifrice of the desired consistency. For example, thirty-five parts of the magnesium hydroxide-glycerine paste may be combined with thirty-five parts of precipitated chalk. An additional amount of glycerine to give the mixture the desired consistency is then added together with suitable flavors and, if desired, antiseptic materials. Preferably the glycerine is thickened with a proportion of gelatine, gum tragacanth, or other suitable inocuous material which is adapted to increase the body of the mixture. The paste thus prepared may be packed in suitable containers and distributed to the trade.

While I do not desire to be limited to any particular explanation of the effect of glycerine it may be assumed properly that glycerine prevents ionization of the magnesium hydroxide and that consequently it is incapable of reacting with other ingredients of the mixture. In any event I have found that dentifrices prepared with the magnesium hydroxide and glycerine paste as a base may be stored under the usual conditions for practically indefinite periods without deterioration, whereas pastes in which water suspensions of magnesium hydroxide are used harden rapidly and become worthless in a comparatively short time.

Inasmuch as the magnesium hydroxide-glycerine mixture may be made the basis of numerous compositions which are suitable for use as dentifrices, I desire to claim as my invention particularly the suspension of magnesium hydroxide in glycerine for use in dentifrices and pastes including this suspension as an element of their composition.

As herein indicated various changes may be made in the proportions of the parts and in the methods employed in preparing the product without departing from the invention or sacrificing any of the advantages thereof.

I claim:—

1. A dentifrice material consisting of magnesium hydroxide from which substantially all water has been removed by displacement with glycerin and evaporation.

2. A dentifrice material comprising magnesium hydroxide substantially free from water and suspended in glycerine.

3. A dentifrice material consisting of magnesium hydroxide suspended in a proportion of glycerine equivalent to the water present in a water-suspension obtained by draining milk of magnesia.

4. A tooth paste including in its composition magnesium hydroxide substantially free from water and suspended in glycerine.

5. A tooth paste comprising magnesium hydroxide suspended in glycerine and substantially free from water, together with abrasive and flavoring materials.

In testimony whereof I affix my signature.

FERDINAND W. NITARDY.